(12) United States Patent
Close et al.

(10) Patent No.: US 11,592,317 B2
(45) Date of Patent: Feb. 28, 2023

(54) MAGNETIC POSITION SENSOR SYSTEM, METHOD AND DEVICE WITH ERROR DETECTION

(71) Applicant: Melexis Technologies SA, Bevaix (CH)

(72) Inventors: Gael Close, Bevaix (CH); Eric Lahaye, Tessenderlo (BE); Lionel Tombez, Bevaix (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 0 days.

(21) Appl. No.: 17/749,429

(22) Filed: May 20, 2022

(65) Prior Publication Data

US 2022/0381586 A1 Dec. 1, 2022

(30) Foreign Application Priority Data

May 27, 2021 (EP) .................................... 21176218

(51) Int. Cl.
*G01D 5/14* (2006.01)
*G01D 5/24* (2006.01)
*G01P 3/44* (2006.01)
*G01D 5/244* (2006.01)

(52) U.S. Cl.
CPC ......... *G01D 5/145* (2013.01); *G01D 5/24438* (2013.01); *G01P 3/44* (2013.01)

(58) Field of Classification Search
CPC ....... G01D 5/145; G01D 5/24438; G01P 3/44
See application file for complete search history.

(56) References Cited

U.S. PATENT DOCUMENTS

| 10,527,455 B2 | 1/2020 | Schliesch | |
|---|---|---|---|
| 2015/0022192 A1* | 1/2015 | Ausserlechner | ......... G01B 7/30 324/207.25 |
| 2015/0226581 A1* | 8/2015 | Schott | .................... G01D 5/145 324/207.2 |
| 2018/0106642 A1 | 4/2018 | Schliesch | |
| 2018/0335294 A1* | 11/2018 | Ausserlechner | ....... G01D 5/145 |

FOREIGN PATENT DOCUMENTS

| DE | 102015105854 A1 | 10/2016 |
|---|---|---|
| EP | 1962062 A1 | 8/2008 |
| EP | 2706326 A1 | 3/2014 |
| EP | 2888558 A1 | 7/2015 |
| EP | 3783316 A1 | 2/2021 |

OTHER PUBLICATIONS

Extended European Search Report from EP Application No. 21176218.2, dated Nov. 16, 2021.

* cited by examiner

*Primary Examiner* — Reena Aurora
(74) *Attorney, Agent, or Firm* — Workman Nydegger

(57) ABSTRACT

Method of determining a position of a sensor device relative to a magnetic source, includes: a) determining a first and a second magnetic field component at a first sensor location; b) determining a third and a fourth magnetic field component at a second sensor location; c) determining a first difference of the first and third component, and determining a second difference of the second and fourth component, and determining a first angle based on a ratio of the first and second difference; d) determining a first sum of the first and third component, and determining a second sum of the second and fourth component; e) determining a second angle based on a ratio of said first and second sum; f) comparing the first and second angle to detect error.

15 Claims, 13 Drawing Sheets

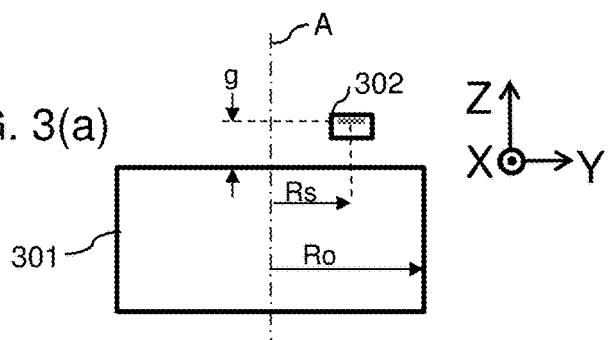
FIG. 3(a)
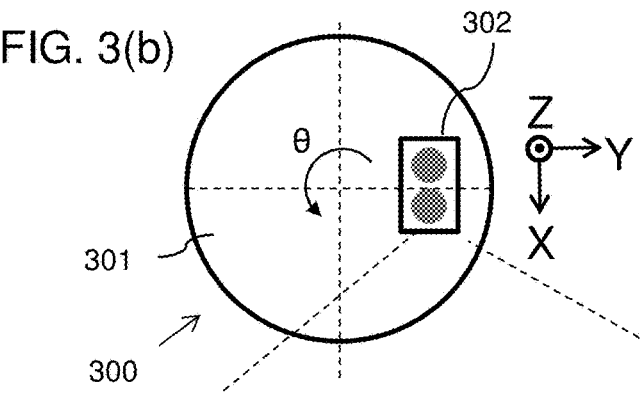
FIG. 3(b)
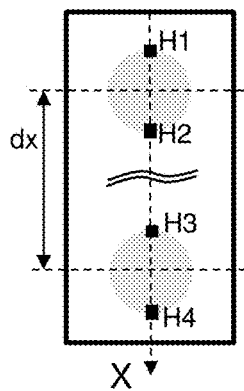
FIG. 3(c)
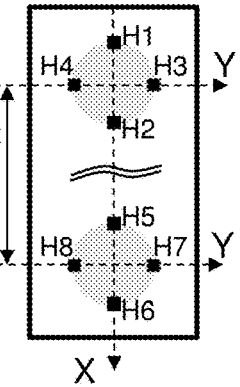
FIG. 3(d)
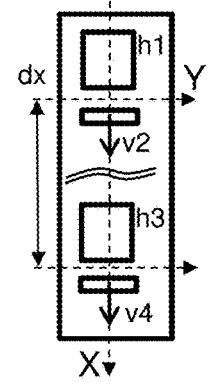
FIG. 3(e)
FIG. 3(f)
$\theta_1 = \mathrm{atan2}(\Delta Bx, \Delta Bz)$
$\theta_2 = \mathrm{atan2}(\sum Bx, \sum Bz)$
Test if $\theta_1 \approx (\theta_2 + 90°)$
Example1:
Bx1=(h2−h1)
Bx2=(h4−h3)
ΔBx=Bx2−Bx1
∑Bx=Bx1+Bx2
Bz1=(h1+h2)
Bz2=(h3+h4)
ΔBz=Bz2−Bz1
∑Bz=Bz1+Bz2
Example2:
Bx1=(h2−h1)
Bx2=(h6−h5)
ΔBx=Bx2−Bx1
∑Bx=Bx1+Bx2
Bz1=(h3+h4)
Bz2=(h7+h8)
ΔBz=Bz2−Bz1
∑Bz=Bz1+Bz2
Example3:
Bx1=v2
Bx2=v4
ΔBx=Bx2−Bx1
∑Bx=Bx1+Bx2
Bz1=h1
Bz2=h3
ΔBz=Bz2−Bz1
∑Bz=Bz1+Bz2

FIG. 4(a)
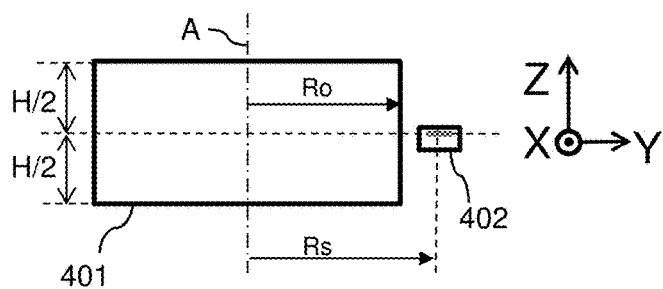
FIG. 4(b)
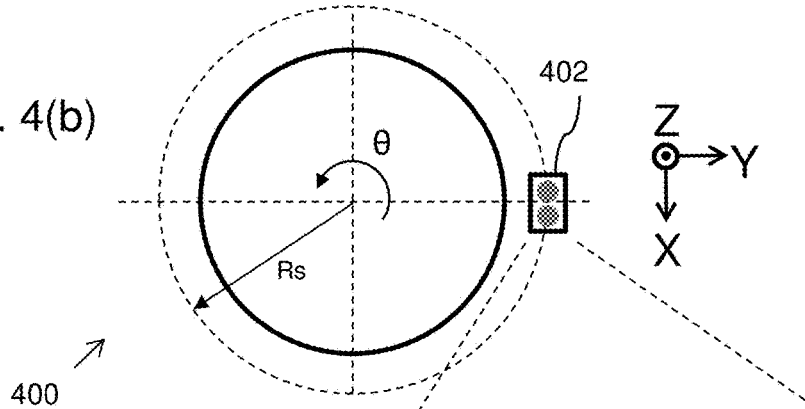
FIG. 4(c)
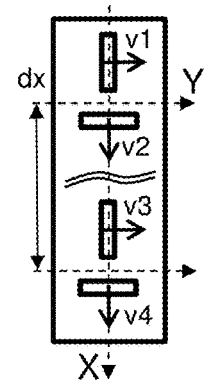
FIG. 4(d)
FIG. 4(e)
| $\theta 1 = \text{atan2}(\Delta Bx, \Delta By)$ |
| $\theta 2 = \text{atan2}(\Sigma Bx, \Sigma By)$ |
| Test if $\theta 1 \approx (\theta 2 + 90°)$ |
| Example1: | Example2: |
|---|---|
| $Bx1 = (h2-h1)$ | $By1 = v1$ |
| $Bx2 = (h6-h5)$ | $By2 = v3$ |
| $\Delta Bx = Bx2 - Bx1$ | $\Delta By = (v3-v1)$ |
| $\Sigma Bx = Bx2 + Bx1$ | $\Sigma By = (v3+v1)$ |
| $By1 = (h3-h4)$ | $Bx1 = v2$ |
| $By2 = (h7-h8)$ | $Bx2 = v4$ |
| $\Delta By = By2 - By1$ | $\Delta Bx = v4 - v2$ |
| $\Sigma By = By1 + By2$ | $\Sigma Bx = v4 + v2$ |

FIG. 5(a)
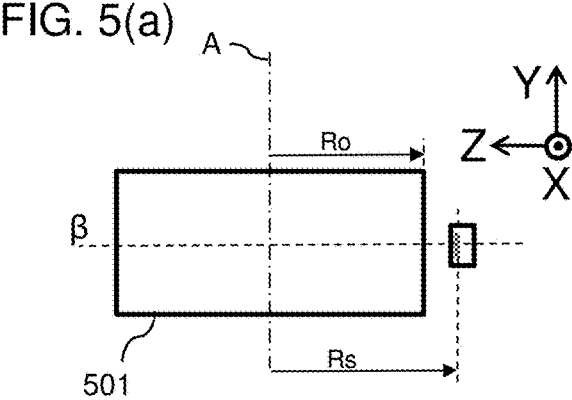
FIG. 5(b)
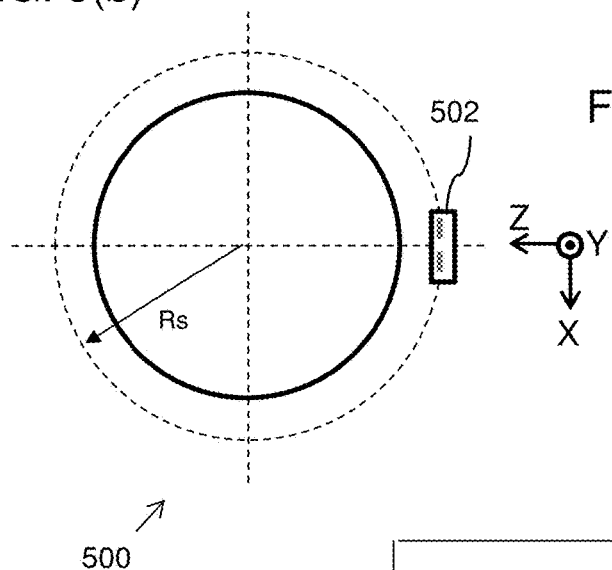
FIG. 5(c)
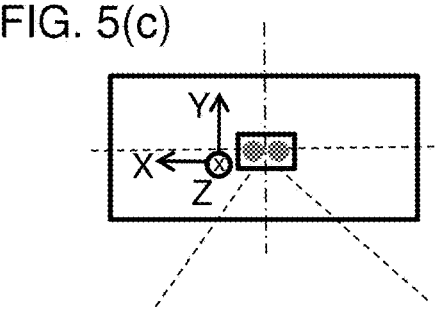
FIG. 5(d)
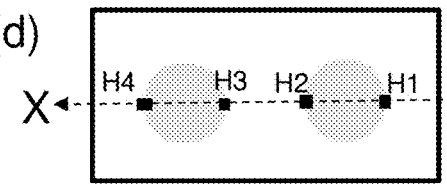
FIG. 5(e)
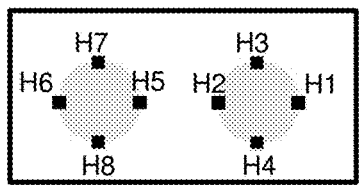
FIG. 5(f)
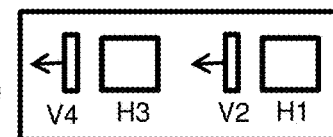
FIG. 5(g)
| | | |
|---|---|---|
| θ1=atan2(ΔBx,ΔBz) | | |
| θ2=atan2(∑Bx,∑Bz) | | |
| Test if θ1≈(θ2+90°) | | |
| Example1: | Example2: | Example3: |
| Bx1=(h2-h1) | Bx1=(h2-h1) | Bx1=v2 |
| Bx2=(h4-h3) | Bx2=(h6-h5) | Bx2=v4 |
| ΔBx=Bx2-Bx1 | ΔBx=Bx2-Bx1 | ΔBx=Bx2-Bx1 |
| ∑Bx=Bx2+Bx1 | ∑Bx=Bx2+Bx1 | ∑Bx=Bx1+Bx2 |
| Bz1=(h1+h2) | Bz1=(h3+h4) | Bz1=h1 |
| Bz2=(h4+h3) | Bz2=(h7+h8) | Bz2=h3 |
| ΔBz=Bz2-Bz1 | ΔBz=Bz2-Bz1 | ΔBz=Bz2-Bz1 |
| ∑Bz=Bz1+Bz2 | ∑Bz=Bz1+Bz2 | ∑Bz=Bz1+Bz2 |

MAGNETIC POSITION SENSOR SYSTEM, METHOD AND DEVICE WITH ERROR DETECTION

FIELD OF THE INVENTION

The present invention relates in general to the field of magnetic position sensor systems, devices and methods, and more in particular to linear and/or angular magnetic position sensor systems and devices with error detection capabilities, and methods of determining a linear or angular position and detecting if an error has occurred.

BACKGROUND OF THE INVENTION

Magnetic sensor systems, in particular linear or angular position sensor systems are known in the art. They offer the advantage of being able to measure a linear or angular position without making physical contact, thus avoiding problems of mechanical wear, scratches, friction, etc.

Many variants of position sensor systems exist, addressing one or more of the following requirements: using a simple or cheap magnetic structure, using a simple or cheap sensor device, being able to measure over a relatively large range, being able to measure with great accuracy, requiring only simple arithmetic, being able to measure at high speed, being highly robust against positioning errors, being highly robust against an external disturbance field, providing redundancy, being able to detect an error, being able to detect and correct an error, having a good signal-to-noise ratio (SNR), etc.

Often two or more of these requirements conflict with each other, hence a trade-off needs to be made.

EP3783316(A1) discloses magnetic position sensor systems comprising a magnet or a magnetic structure, and a sensor device movably mounted relative to said magnet or magnetic structure. The systems described in this document, however, do not have error detection capabilities.

There is always room for improvements or alternatives.

SUMMARY OF THE INVENTION

It is an object of embodiments of the present invention to provide a magnetic position sensor system capable of determining a position of a sensor device relative to a magnet or a magnetic structure, and capable of detecting an error, (e.g. an error related to a defective sensor or transducer).

It is also an object of embodiments of the present invention to provide a sensor device specifically adapted for use in such a system.

It is also an object of embodiments of the present invention to provide a method of determining a position of a sensor device relative to a magnet or a magnetic structure, and to provide additional information indicative of an error, and/or allowing the detection of an error by another processor connected to the sensor device.

It is an object of embodiments of the present invention to provide such a system, device and method, wherein the position is determined in a manner which is highly insensitive to an external disturbance field (also known as "stray field").

These objectives are accomplished by embodiments of the present invention.

According to a first aspect, the present invention provides a position sensor device comprising: a first sensor configured for determining a first magnetic field component (e.g. Bx1) and a second magnetic field component (e.g. By1 or Bz1) at a first sensor location, the first magnetic field component oriented in a first direction (e.g. X), the second magnetic field component oriented in a second direction (e.g. Y or Z) perpendicular to the first direction; and a second sensor configured for determining a third magnetic field component (e.g. Bx2) and a fourth magnetic field component (e.g. By2 or Bz2) at a second sensor location spaced from the first sensor location, the third magnetic field component oriented in the first direction, the fourth magnetic field component oriented in the second direction; a processing unit connected to the first sensor and to the second sensor, and configured for determining a first difference (e.g. ΔBx) between the first and the third magnetic field component, and for determining a second difference (e.g. ΔBy or ΔBz) between the second and the fourth magnetic field component, and for determining a first angle (e.g. θ1) based on a ratio of the first and second difference, and for outputting the first angle; wherein the processing unit is further configured for performing one of the following:

i) determining a first sum (e.g. ΣBx) of the first and the third magnetic field component, and determining a second sum (e.g. ΣBy or ΣBz) of the second and the fourth magnetic field component, and outputting the first sum and the second sum for allowing an external processor to determine a second angle (e.g. θ2) and to compare the first and second angle in order to detect an error; ii) determining a first sum (e.g. ΣBx) of the first and the third magnetic field component, and determining a second sum (e.g. ΣBy or ΣBz) of the second and the fourth magnetic field component, and determining a second angle (e.g. θ2) based on a ratio of the first sum and the second sum, and outputting the second angle for allowing an external processor to compare the first and second angle in order to detect an error; iii) determining a first sum (e.g. ΣBx) of the first and the third magnetic field component, and determining a second sum (e.g. ΣBy or ΣBz) of the second and the fourth magnetic field component, and determining a second angle (e.g. θ2) based on a ratio of the first sum and the second sum, and comparing the first angle and the second angle, and outputting a diagnostic signal based on a result of the comparison.

It is an advantage that the first angle (also referred to herein as "main angle") is calculated based on a ratio of two difference signals (or gradients), because this first angle is highly robust against an external disturbance field (also known as "strayfield").

It is an advantage of this sensor system that a second angle is calculated based on a ratio of two sum signals, because a comparison of the first and second angle allows to detect an error, e.g. a defect of one of the sensor elements. The inventors surprisingly found that such a comparison is very well feasible, even in the presence of an external disturbance field.

In an embodiment, the first sensor comprises a first integrated magnetic concentrator and a first and a second horizontal Hall element arranged on opposite sides of the first IMC; and the second sensor comprises a second integrated magnetic concentrator and a third and a fourth horizontal Hall element arranged on opposite sides of the second IMC.

Examples of such position sensor device are shown in FIG. 3(c), FIG. 3(d), FIG. 4(c), FIG. 5(d), FIG. 5(e). The first and second sensor may be spaced apart by 1.0 mm to 3.0 mm.

In some of these embodiments, the position sensor device comprises two IMC with only two horizontal Hall elements each, thus only four horizontal Hall elements in total, e.g. as illustrated in FIG. 3(c) and FIG. 5(d). It is an advantage of these embodiments that diagnostic functionality is provided without increasing the number of sensor elements.

In an embodiment, the first sensor further comprises a fifth and a sixth horizontal Hall element which are 90° spaced from the first and second horizontal Hall element; and the second sensor further comprises a seventh and an eighth horizontal Hall element which are 90° spaced from the third and fourth horizontal Hall element.

Examples of such position sensor device are shown in FIG. 3(d), FIG. 4(c), FIG. 5(e).

In an embodiment, the second magnetic field component (By1) and the fourth magnetic field component (By2) are oriented in the Y direction, parallel to the semiconductor substrate, e.g. as illustrated in FIG. 4(c).

In an embodiment, the second magnetic field component (Bz1) and the fourth magnetic field component (Bz2) are oriented in the Z direction, perpendicular to the semiconductor substrate, e.g. as illustrated in FIG. 3(d) and FIG. 5(e). The second and the fourth magnetic field component may be determined based on signals obtained from the Hall elements which are not located on the X axis, i.e. based on the signals h3, h4, h7, h8 of FIG. 3(d) and FIG. 5(e)

In an embodiment, the first sensor comprises a first horizontal Hall element and a first vertical Hall element; and the second sensor comprises a second horizontal Hall element and a second vertical Hall element.

Examples of such position sensor device are shown in FIG. 3(e), and FIG. 5(f). Preferably in this case, the position sensor device does not comprise integrated magnetic concentrators. It is an advantage of these embodiments that diagnostic functionality is provided without increasing the number of sensor elements. The vertical Hall elements may have a direction of maximum sensitivity oriented in the first direction (X).

In an embodiment, the first sensor comprises a first and a second vertical Hall element; and the second sensor comprises a third and a fourth vertical Hall element.

An example of such position sensor device is shown in FIG. 4(d). Preferably in this case, the position sensor device does not comprise integrated magnetic concentrators. It is an advantage of these embodiments that diagnostic functionality is provided without increasing the number of sensor elements.

According to a second aspect, the present invention also provides a magnetic position sensor system comprising: a magnetic source for generating a magnetic field having at least two poles; and a position sensor device according to the first aspect, movable relative to said magnetic source, or vice versa.

In an embodiment, the magnetic source is a permanent magnet, rotatable about a rotation axis; and the position sensor device is mounted at a nonzero radial distance and is oriented such that the first direction is tangential to an imaginary circle having a centre on the rotation axis.

Such a position sensor system is commonly referred to as "angular position sensor system".

The magnet may be an axially or diametrically or radially magnetised ring magnet or disk magnet, more in particular, an axially or diametrically two-pole ring or disk magnet, or an axially or radially magnetized ring or disk magnet having more than two poles, for example at least four poles or at least six poles, or at least eight poles.

In an embodiment, the magnetic source is an elongated structure comprising a plurality of alternating magnetic poles extending in a longitudinal direction; and the position sensor device is movable in the longitudinal direction, at a nonzero distance from the magnetic source.

Preferably the distance is substantially constant. Preferably the sensor device is oriented with its first direction (X) parallel to the longitudinal direction of the magnetic source.

Such a position sensor system is commonly referred to as "linear position sensor system". Preferably, in this case, the position sensor device is further configured for converting at least the first angle θ1 into a first linear position, in manners known per se in the art.

In an embodiment, the magnetic position sensor system further comprises a second processor (e.g. ECU) communicatively connected to the position sensor device, and configured for performing one of the following: i) receiving the first angle, the first sum and the second sum, and determining the second angle based on a ratio of the first sum and the second sum, and comparing the first and the second angle to detect an error; ii) receiving the first and the second angle, and comparing the first and the second angle to detect an error; iii) receiving the first angle and a diagnostic signal indicative of an error.

In this embodiment, the first processor and the second processor may cooperate to detect if an error has occurred, and/or to take appropriate action at system level. By performing certain functions on two different processors, the probability of detection an error may be further increased.

According to a third aspect, the present invention also provides a method of determining a position of a position sensor device relative to a magnetic source, comprising the steps of: a) determining a first magnetic field component and a second magnetic field component at a first sensor location, the first magnetic field component being oriented in a first direction, the second magnetic field component being oriented in a second direction perpendicular to the first direction; b) determining a third magnetic field component and a fourth magnetic field component at a second sensor location spaced from the first sensor location, the third magnetic field component oriented in the first direction, the fourth magnetic field component oriented in the second direction; c) determining a first difference between the first and the third magnetic field component, and determining a second difference between the second and the fourth magnetic field component, and determining a first angle based on a ratio of the first and second difference, and outputting the first angle; d) determining a first sum of the first and the third magnetic field component, and determining a second sum of the second and the fourth magnetic field component, and optionally outputting or transmitting the first sum and the second sum to a second processor; e) determining a second angle based on a ratio of the first sum and the second sum, and optionally outputting or transmitting the second angle; f) comparing the first angle and the second angle, and optionally outputting a diagnostic signal based on a result of the comparison.

These steps are performed by the angular position sensor system, some or all of which may be performed by the processing unit inside the position sensor device. More specifically, steps e) and f) may be performed by a second processor, communicatively connected to, but physically external to the position sensor device itself.

In an embodiment, the system further comprises a second processor connected to the position sensor device, and the method further comprising the steps of: receiving by the second processor the first angle; and performing one of the following: i) receiving the first angle and receiving the first sum and the second sum, and determining the second angle based on a ratio of the first sum and the second sum, and comparing the first and second angle to detect an error; ii) receiving the first angle, and receiving the second angle, and comparing the first and second angle to detect an error; iii) receiving the first angle and receiving a diagnostic signal indicative of an error.

As mentioned in the claim, these steps may be performed by the second processor, e.g. by an ECU, external to the magnetic sensor device.

In an embodiment, the step of comparing the first and second angle comprises: testing if a difference between the first and second angle is a value in a predefined range.

The predefined range may be the range of [90°±ε], or the range of [−90°±ε].

The value of ε can be chosen dependent on the maximum allowed external magnetic field, but is typically a value smaller than 10°, or smaller than 5°, or smaller than 2.0°, or smaller than 1.0°, or smaller than 0.5°.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 3(a) and FIG. 3(b) show a first example of an angular magnetic position sensor system proposed by the present invention, in front view and in top view respectively.

FIG. 3(c) to FIG. 3(e) are schematic block diagrams of sensor structures which may be used in the sensor device of FIG. 3(b).

FIG. 3(f) is a table showing formulas which may be used by the sensor device of FIG. 3(b).

FIG. 4(a) and FIG. 4(b) show a second example of an angular magnetic position sensor system proposed by the present invention, in front view and in top view respectively.

FIG. 4(c) and FIG. 4(d) are schematic block diagrams of sensor structures which may be used in the sensor device of FIG. 4(b).

FIG. 4(e) is a table showing formulas which may be used by the sensor device of FIG. 4(b).

FIG. 5(a) to FIG. 5(c) show a third example of an angular magnetic position sensor system proposed by the present invention, in front view, in top view and in side-view respectively.

FIG. 5(d) to FIG. 5(f) are schematic block diagrams of sensor structures which may be used in the sensor device of FIG. 5(b).

FIG. 5(g) is a table showing formulas which may be used by the sensor device of FIG. 5(b).

Figure 1:
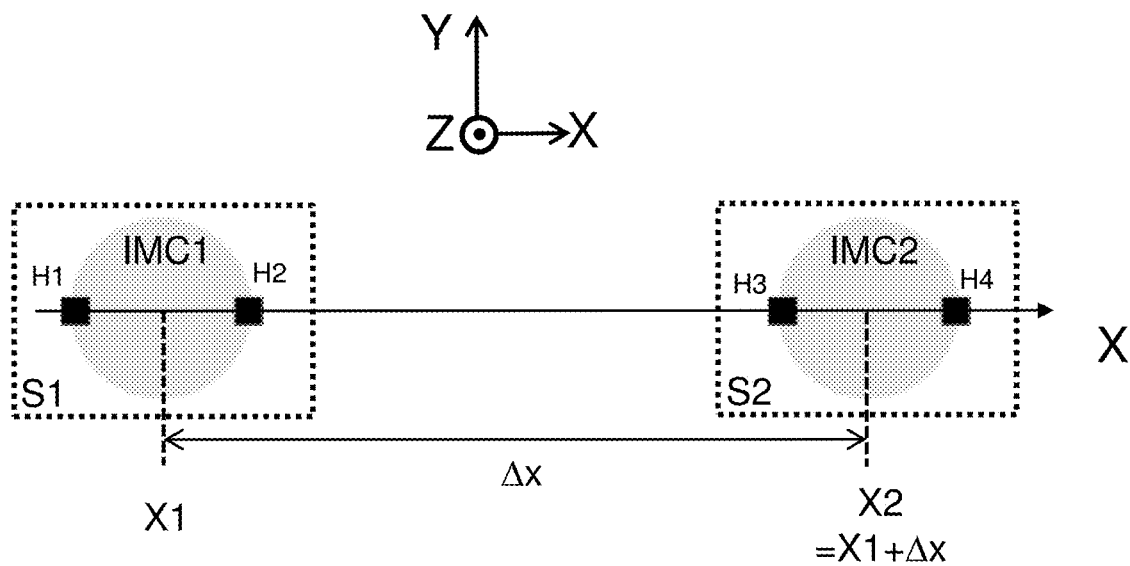
FIG. 1 is a schematic block-diagram of a sensor structure as may be used in embodiments of the present invention. The sensor structure comprises a first sensor at a first location X1, and a second sensor at a second location X2 along an X-axis, each sensor comprising an integrated magnetic concentrator (IMC) and a pair of two horizontal Hall elements arranged on opposite sides of the IMC.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

The terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, unless explicitly mentioned otherwise, the term "magnetic sensor device" or "sensor device" refers to a device comprising at least one "magnetic sensor" or at least one magnetic "sensor element", preferably integrated in a semiconductor substrate. The sensor device may be comprised in a package, also called "chip", although that is not absolutely required. The sensor device preferably contains a semiconductor substrate.

In this document, the term "sensor element" or "magnetic sensor element" or "magnetic sensor" can refer to a component or a group of components or a sub-circuit or a structure capable of measuring a magnetic quantity, such as for example a magneto-resistive element, a GMR element, an XMR element, a horizontal Hall plate, a vertical Hall plate, a Wheatstone-bridge containing at least one (but preferably four) magneto-resistive elements, etc. or combinations hereof.

Figure 2:
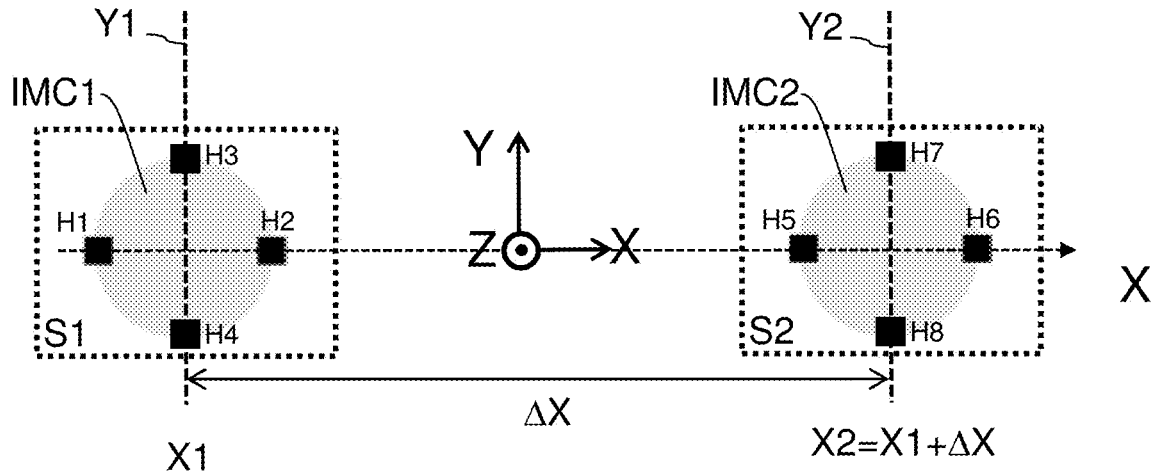
FIG. 2 is a schematic block-diagram of a sensor structure which is a variant of FIG. 1.

In certain embodiments of the present invention, the term "magnetic sensor" or "magnetic sensor structure" may refer to an arrangement comprising one or more integrated magnetic concentrators (IMC), also known as integrated flux concentrators, and one or more horizontal Hall elements arranged near the periphery of the IMC, for example a disk shaped IMC with two horizontal Hall elements 180° spaced from each other (e.g. as illustrated in FIG. 1), or an IMC with four horizontal Hall elements 90° spaced from each other (e.g. as illustrated in FIG. 2).

In this document, the expression "in-plane component of a magnetic field vector" and "projection of the magnetic field vector in the sensor plane" mean the same. If the sensor device is or comprises a semiconductor substrate, this also means "magnetic field components parallel to the semiconductor plane".

In this document, the expression "out-of-plane component of a vector" and "Z component of the vector" and "projection of the vector on an axis perpendicular to the sensor plane" mean the same.

Embodiments of the present invention are typically described using an orthogonal coordinate system which is fixed to the sensor device, and having three axes X, Y, Z, where the X and Y axis are parallel to the substrate, and the Z-axis is perpendicular to the substrate. Furthermore, the X-axis is preferably oriented "parallel to the direction of relative movement" in case of a linear position sensor", or "tangential to the movement trajectory" in case of a curved movement trajectory, or in a "circumferential direction", i.e. tangential to an imaginary circle having a centre located on the rotation axis in case of an angular position sensor system comprising a rotatable magnet. In case of an angular position sensor system, one of the other axes (Y or Z) is preferably oriented parallel to the rotation axis of the magnet. For example, in FIG. 3(a) and FIG. 4(a) the Z-axis is parallel to the rotation axis of the magnet, while in FIG. 5(a) the Y-axis is parallel to the rotation axis.

In this document, the expression "spatial derivative" or "derivative" or "spatial gradient" or "gradient" are used as synonyms. In the context of the present invention, the gradient is typically determined as a difference between two values measured at two locations spaced apart in the X-direction. In theory the gradient is calculated as the difference between two values divided by the distance "dx" between the sensor locations, but in practice the division by "dx" is often omitted, because the measured signals need to be scaled anyway. Hence, in the context of the present invention, the magnetic field difference ($\Delta Bx$) and magnetic field gradient $dBx/dx$ are used interchangeably.

In this document, the term "magnitude of a magnetic field component By" means "the maximum of the absolute value of the By-signal over a full 360° rotation", and likewise for Bx and Bz.

In this application, horizontal Hall plates are typically referred to by H1, H2, etc., signals from these horizontal Hall plates are typically referred to by h1, h2, etc.; vertical Hall plates are typically referred to by V1, V2, etc.; and signals from these vertical Hall plates are typically referred to by v1, v2, etc.

In the context of the present invention, the formulas $\arctan(x/y)$, $a\tan 2(x,y)$, $\text{arccot}(y/x)$ are considered to be equivalent.

The present invention is related in general to linear or angular magnetic position sensor systems, comprising a sensor device and a magnetic source, e.g. a permanent magnet, e.g. an axially or diametrically or radially magnetized ring or disk magnet, e.g. an axially or diametrically magnetized two-pole ring or disk magnet, or an axially or radially magnetized ring or disk magnet having more than two poles, e.g. at least four poles or at least six poles or at least eight poles. The present invention is also related to linear position sensor systems comprising a sensor device and a magnetic source in the form of an elongated magnetic structure comprising a plurality of alternating poles. More specifically, the present invention is related to magnetic sensor methods and systems which are robust against an external disturbance field, and which have error detection capabilities.

Referring to the Figures.

FIG. 1 shows a sensor structure comprising a first sensor S1 located at a first location X1 on an X-axis, and a second sensor S2 located at a second location X2 on said X-axis, spaced from X1. Each of the first and second sensor S1, S2 comprises a disk shaped integrated magnetic concentrator (IMC) and two horizontal Hall elements arranged on the X-axis, on opposite sides of the IMC. The first sensor S1 comprises a first horizontal Hall element H1 configured for providing a first signal h1, and a second horizontal Hall element H2 configured for providing a second signal h2. The second sensor S2 comprises a third horizontal Hall element H3 configured for providing a third signal h3, and a fourth horizontal Hall element H4 configured for providing a fourth signal h4.

In order to understand the present invention, it suffices to know that the signals h1 and h2 of the first sensor S1 can be combined to determine both an in-plane magnetic field component Bx1 (parallel to the sensor substrate) and an out-of-plane magnetic field component Bz1 (perpendicular to the sensor substrate). More in particular, the in-plane magnetic field component Bx1 can be calculated by a subtraction of the signals, and the out-of-plane magnetic field component Bz1 can be calculated by a summation of the signals. This can be expressed mathematically as follows:

$$Bx1=(h2-h1) \quad [1]$$

$$Bz1=(h2+h1) \quad [2]$$

Likewise, the in-plane magnetic field component Bx2, and the out-of-plane magnetic field component Bz2 at the second sensor location X2 can be determined, e.g. in accordance with the following formulas:

$$Bx2=(h4-h3) \quad [3]$$

$$Bz2=(h4+h3) \quad [4]$$

And from these values an in-plane magnetic field gradient ΔBx and an out-of-plane magnetic field gradient ΔBz can be determined, e.g. in accordance with the following formulas:

$$\Delta Bx=Bx2-Bx1 \quad [5]$$

$$\Delta Bz=Bz2-Bz1 \quad [6]$$

The value ΔBx can also be referred to as dBx/dx, and the value ΔBz can also be referred to as dBz/dx. As mentioned above, the scaling factor "dx" is typically omitted, because it is constant, and the values need to be scaled anyway. For this reason, in this application the terms "magnetic field gradient" and "magnetic field difference" mean the same.

It is known that the gradient signals ΔBx, ΔBz are highly insensitive to an external disturbance field.

It is noted that a sensor device (not shown in FIG. 1, but see e.g. FIG. 3(e) and FIG. 5(f)) having two sensor structures, spaced apart by a distance ΔX, wherein each sensor structure comprises one horizontal Hall element and one vertical Hall element (with its axis of maximum sensitivity oriented in the X-direction), is also capable of measuring Bx1, Bx2, Bz1, Bz2.

FIG. 2 shows a sensor structure comprising two sensors S1, S2, each having an IMC-structure and four horizontal Hall elements, as can be used in embodiments of the present invention. This sensor structure is a variant of the sensor structure of FIG. 1, the main difference being that each sensor comprises four horizontal Hall elements arranged near a periphery of the integrated magnetic concentrator IMC, instead of only two. The four Hall elements are spaced apart by multiples of 90°. Two of the Hall elements of each sensor are located on the X-axis, the other two elements are located on the Y-axis perpendicular to the X-axis.

This sensor structure is furthermore capable of measuring a magnetic field component By1 at the first sensor location X1, and measuring By2 at the second sensor location X2, both oriented in the Y direction, perpendicular to the X and Z direction. The value of By1 and By2 can be calculated in accordance with the following formulas:

$$By1=(h3-h4) \quad [7]$$

$$By2=(h7-h8) \quad [8]$$

And from these values another in-plane magnetic field gradient ΔBy along the X-axis, sometimes also denoted as "dBy/dx" can be determined, e.g. in accordance with the following formula:

$$\Delta By=By2-By1 \quad [9]$$

It is noted that a sensor device (not shown in FIG. 2, but see e.g. FIG. 4(d)) having two sensor structures, spaced apart by a distance ΔX, wherein each sensor structure comprises two vertical Hall elements (one with its axis of maximum sensitivity oriented in the X-direction, and one with its axis of maximum sensitivity oriented in the Y direction), is also capable of measuring Bx1, By1 at the first sensor location and Bx2, By2 at the second sensor location, and thus capable of determining the magnetic field gradients ΔBx, ΔBy.

FIG. 3(a) and FIG. 3(b) show an angular magnetic position sensor system 300, in front view and in top view respectively. The system 300 comprises a cylindrical magnet 301 and a sensor device 302. The magnet may be an axially or diametrically magnetised two-pole ring magnet or disk magnet, or an axially or radially magnetized multi-pole ring magnet or disk magnet having at least four or at least six or at least eight poles. In the example shown, the magnet is rotatable about a rotation axis A. The sensor device is mounted in an "off-axis" position relative to the magnet. The sensor device comprises two sensors which are located at a radial distance Rs from the rotation axis A, and at an axial distance "g" from the magnet.

The magnet may have a diameter of 4.0 to 20 mm, e.g. about 10 or about 12 mm. The radial distance Rs may be 30% to 70%, or 40% to 60% of an outer radius Ro of the magnet. The axial distance "g" may be 0.5 to 5.0 mm, e.g. about 2.0 mm, but the present invention is not limited thereto and other values may also be used FIG. 3(c) to FIG. 3(e) are schematic block diagrams of sensor structures which may be used in the sensor device 302 of FIG. 3(b). The sensor structure of FIG. 3(c) is illustrated in FIG. 1. The sensor structure of FIG. 3(d) is illustrated in FIG. 2. The sensor structure of FIG. 3(e) is described above as an alternative for the sensor structure of FIG. 1. It is pointed however that the present invention is not limited to these sensor structures, and other sensor structures may also be used, for example a sensor structure comprising two sensors, each sensor comprising a horizontal Hall element and at least one magneto-resistive (MR) element.

The first and the second sensor may be spaced apart by a distance "dx" in the range from 1.0 to 3.0 mm, or from 1.5 to 2.5 mm, e.g. equal to about 1.8 mm, or about 2.0 mm, or about 2.2 mm.

FIG. 3(f) is a table showing formulas which may be used by the sensor device of FIG. 3(b).

It is known that the angular position θ of the sensor device 302 relative to the magnet 301 can be determined as an arctangent of the ratio of ΔBx and ΔBz, in accordance with the following formula: θ=a tan 2(ΔBx,ΔBz), and that this value is highly insensitive to an external disturbance field. The sensor device 302 may be configured for providing this value as a first angle value:

$$\theta 1=a \tan 2(\Delta Bx, \Delta Bz) \quad [10]$$

However, this angle value alone does not allow to detect an error, e.g. to detect if one of the sensor elements is defective, and/or if its biasing is defective, and/or if its readout circuit is defective.

Desiring to provide an angular sensor system which is capable of measuring the angular position in a manner which is highly insensitive to an external disturbance field, but which is furthermore also capable of detecting an error, the inventors came to the idea of calculating a first sum of the Bx values, and a second sum of the Bz values, and determining a second angle θ2 based on the ratio of the first sum and the second sum, e.g. in accordance with the following formulas:

$$\Sigma Bx=(Bx1+Bx2) \quad [11]$$

$$\Sigma Bz=(Bz1+Bz2) \quad [12]$$

$$\theta 2 = a\tan 2(\Sigma Bx, \Sigma Bz) \quad [13]$$

It is counter-intuitive to use a value (the sum) which is sensitive to an external disturbance field for assessing correct functioning of a sensor device that has to be highly insensitive to an external disturbance field. It is also noted that the first angle θ1 and the second angle θ2 are not the same, hence it is not trivial to use this second angle θ2 to check an error of the first angle θ1.

Despite these hurdles, experiments were conducted, and it turned out that:
i) the angle values θ1 and θ2 differ approximately by 90° if all sensor elements are functioning correctly, in the absence of an external disturbance field;
ii) the angle values θ1 and θ2 differ by a value in the range of [90°±ε], where ε is smaller than 10°, or smaller than 5°, or smaller than 2°, or smaller than 1.0°, or smaller than 0.5°, if all sensor elements are functioning correctly, in the presence of moderate or a relatively weak external disturbance field;
iii) the angle values θ1 and θ2 differ by a value outside the range [90°±τ], where τ is smaller than 10°, or smaller than 5°, or smaller than 2°, or smaller than 1.0°, or smaller than 0.5°, if one of the sensor elements is defective, irrespective of the external disturbance field.

The tolerance margin(s) may be chosen dependent on the envisioned amplitude of the external disturbance field. It is noted that the tolerance margin τ may be equal to, or larger than the tolerance margin ε. In case τ is chosen to be larger than 6, the sensor device may output a warning, which could mean a defect or an unusually high external disturbance field, or a glitch.

Taking into account that in practice the angular sensor system is typically designed (magnetic field strength of the magnet, distance from the magnet) such that the magnitude of the external disturbance field typically has an amplitude smaller than 10% of the magnetic field component induced by the magnet, these experiments show that it is possible to detect an error by comparing the first and second angle, even in the presence of a moderate external disturbance field. This is one of the underlying principles of the present invention.

Referring back to FIG. 3(f), it can now be understood that the formulas of "Example1" and the sensor structure of FIG. 3(c) can be used to calculate two angle values θ1 and θ2, one of which (namely θ1) is highly insensitive to an external disturbance field, the other (namely θ2) being dependent on an external disturbance field, but as explained above, surprisingly found to be sufficiently accurate to detect an error, e.g. to detect if one of the sensor elements is defective. It is an advantage of this embodiment that no physical sensor elements needed to be added, but that diagnostic information can be obtained by processing the signals obtained from the already existing sensor elements in a different manner.

Similarly, the formulas of FIG. 3(f) "Example3" and the sensor structure of FIG. 3(e) can be used to calculate two angular values θ1 and θ2, and to detect an error, e.g. to detect if one of the sensor elements is defective.

Similarly, the formulas of FIG. 3(f) "Example2" and the sensor structure of FIG. 3(d) can be used to calculate two angular values θ1 and θ2, and to detect an error, e.g. to detect if one of the sensor elements is defective, but as compared to the sensor structure of FIG. 3(c), four physical sensor elements are added for redundancy purposes, namely: H3, H4, H7, H8 of FIG. 3(d).

It is noted that, while it is possible to compute both angles θ1 and θ2 inside the sensor device 302, and to compare these values inside the sensor device 302, and to provide a diagnostic signal indicative of an error, that is not absolutely required for the invention to work. Indeed, in some embodiments of the present invention the sensor device 302 is configured for calculating and providing the two angles θ1 and θ2, but the comparison is performed outside of the sensor device 302, for example in another processing unit, e.g. in an Electronic Control Unit (ECU) connected to the sensor device 302 (see e.g. FIG. 10 to FIG. 12). In some embodiments of the present invention, the sensor device 302 provides the first angle θ1, and the first sum ΣBx and the second sum ΣBz, and the second angle θ2 may be calculated outside of the sensor device 302, and the comparison of the first and second angle may be performed outside of the sensor device 302. This will be discussed in more detail further.

In a variant of FIG. 3(a) and FIG. 3(b), the sensor device 302 is not arranged at a radial distance Rs substantially equal to Rs=Ro/2 (in case of a disk magnet) or Rs=(Ri+Ro)/2 in case of a ring magnet, (Ri being the inner radius, Ro being the outer radius), but is positioned at a radial distance Rs closer to the rotation axis, or further away from the rotation axis. In this case, the first and second angle may be calculated in accordance with the following formulas:

$$\theta 1 = a\tan 2(L^* \Delta Bx, \Delta Bz) \quad [10b]$$

$$\theta 2 = a\tan 2(M^* \Sigma Bx, \Sigma Bz) \quad [13b]$$

where L and M are predefined constants, which may be determined during design or simulation, or determined during calibration and stored in a non-volatile memory of the sensor device.

FIG. 4(a) and FIG. 4(b) show another angular magnetic position sensor system 400, in front view and in top view respectively, comprising a magnet 401 and a sensor device 402. Again, the magnet is movable relative to the sensor device, or vice versa. The sensor system 400 can be seen as a variant of the sensor system 300 of FIG. 3(a), and most of what has been described above is also applicable here, mutatis mutandis. The main differences are:
i) the sensor device 402 is located at a radial distance Rs larger than the outer radius Ro of the magnet, and at an axial position between the bottom surface and the top surface, preferably substantially halfway the height of the magnet 401;
ii) the sensor device 402 is configured for measuring two in-plane gradients ΔBx and ΔBy, and to calculate the first angle θ1 in accordance with the following formula:

$$\theta 1 = a\tan 2(\Delta Bx, \Delta By) \quad [14]$$

iii) the sensor device 402 is configured for measuring a first sum ΣBx and a second sum ΣBy, e.g. in accordance with the following formulas:

$$\Sigma Bx = (Bx1 + Bx2) \quad [15]$$

$$\Sigma By = (By1 + By2) \quad [16]$$

$$\theta 2 = a\tan 2(\Sigma Bx, \Sigma By) \quad [17]$$

FIG. 4(c) and FIG. 4(d) are schematic block diagrams of sensor structures which may be used in the sensor device 402. The sensor structure of FIG. 4(c) is illustrated in FIG. 2. The sensor structure of FIG. 4(d) comprises two sensors, each having two vertical Hall plates, one oriented with its axis of maximum sensitivity in the Y-direction, one with its axis of maximum sensitivity in the X-direction. It is pointed out that other sensor structures capable of measuring Bx and By can also be used, for example sensor structures comprising magneto-resistive (MR) elements, e.g. GMR elements or XMR elements.

FIG. 4(e) is a table showing formulas which may be used by the sensor device 402. More in particular, the formulas of "Example1" can be used in combination with the sensor structure of FIG. 4(c), and the formulas of "Example2" can be used in combination with the sensor structure of FIG. 4(d), in order to calculate two angular values θ1 and θ2, and to detect an error, e.g. to detect if one of the sensor elements is defective, based on an angular difference between the angles θ1 and θ2, e.g. by testing if the value (θ1−θ2) falls inside the range (90°±ε) and/or outside the range (90°±τ), where ε and τ are predefined threshold values. As mentioned above, ε and τ may be equal, or may be different.

As mentioned above, it is possible to calculate both angles θ1 and θ2 inside or outside the sensor device 402, and/or to compare the values θ1 and θ2 inside or outside the sensor device 402.

In FIG. 4(a) and FIG. 4(b), the sensor device is located at an axial position substantially halfway the bottom and top surface of the cylindrical magnet 401, but the invention will also work if the magnet is axially shifted upwards or downwards. In this case, the following formulas may be used:

$$\theta 1 = a\tan 2(L^* \Delta Bx, \Delta By) \quad [14b]$$

$$\theta 2 = a\tan 2(M^* \Sigma Bx, \Sigma By) \quad [17b]$$

where L and M are predefined constants, which may be determined during design or simulation, or determined during calibration and stored in a non-volatile memory of the sensor device.

FIG. 5(a) to FIG. 5(c) show an angular magnetic position sensor system 500, in front view, in top view and in side-view respectively, comprising a magnet 501 and a sensor device 502. The sensor system 500 can be seen as a variant of the sensor system 300 of FIG. 3(a), or as a variant of the sensor system 400 of FIG. 4(a), wherein the sensor device is rotated by 90° about the X-axis. Most of what has been described above is also applicable here, mutatis mutandis.

FIG. 5(d) to FIG. 5(f) are schematic block diagrams of sensor structures which may be used in the sensor device 502. The same sensor structures as shown in FIG. 3(c) to FIG. 3(e) can be used.

FIG. 5(g) is a table showing formulas which may be used by the sensor device of FIG. 5(b). The same formulas as shown in FIG. 3(f) can be used.

While not explicitly shown, the principles described above also work for linear position sensor systems. In this case the magnet is preferably an elongated structure with a plurality of alternating magnetic poles, and the sensor device would be further configured for converting the angular position value θ1 into a linear position value X, in known manners. The sensor elements may be arranged substantially in a symmetry plane of the magnetic structure extending in the elongated direction.

Figure 6:
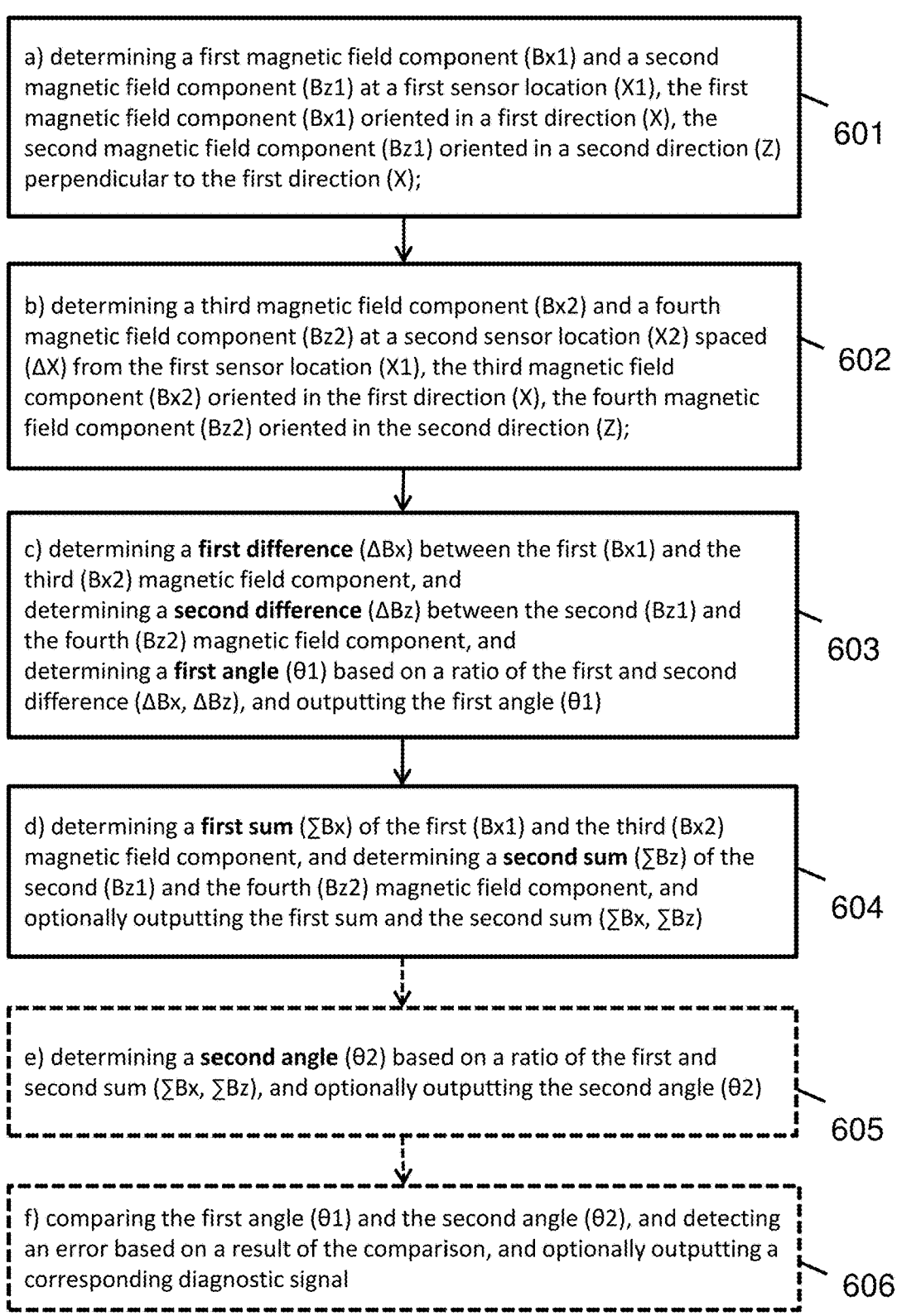
FIG. 6 shows a flow chart of a method of determining two angles, and generating a diagnostic signal, proposed by the present invention. Some or all of the steps may be performed by a position sensor device as illustrated in FIG. 3(b) to FIG. 5(b); or some steps may be performed by a second processor connected to the position sensor device.

FIG. 6 shows a flow chart of a method 600 of determining two angles θ1 and θ2, and for detecting an error, e.g. by generating a diagnostic signal (e.g. a validity signal or an error signal). The method 600 comprises the following steps:

a) determining 601 a first magnetic field component (e.g. Bx1) and a second magnetic field component (e.g. By1 or Bz1) at a first sensor location (e.g. X1), the first magnetic field component being oriented in a first direction (e.g. X, tangential to the direction of relative movement), the second magnetic field component (e.g. By1 or Bz1) being oriented in a second direction (e.g. Y or Z) perpendicular to the first direction;

b) determining 602 a third magnetic field component (e.g. Bx2) and a fourth magnetic field component (e.g. By2 or Bz2) at a second sensor location (e.g. X2) spaced (e.g. by a distance ΔX) from the first sensor location (e.g. X1), the third magnetic field component (e.g. Bx2) oriented in the first direction (e.g. X), the fourth magnetic field component (e.g. By2 or Bz2) oriented in the second direction (e.g. Y or Z);

c) determining 603 a first difference (e.g. ΔBx) between the first (e.g. Bx1) and the third (e.g. Bx2) magnetic field component, and determining a second difference (e.g. ΔBy or ΔBz) between the second (e.g. By1 or Bz1) and the fourth (e.g. By2 or Bz2) magnetic field component, and determining a first angle (θ1) based on a ratio of the first and second difference, and outputting the first angle (θ1);

d) determining 604 a first sum (e.g. ΣBx) of the first (e.g. Bx1) and the third (e.g. Bx2) magnetic field component, and determining a second sum (e.g. ΣBy or ΣBz) of the second (e.g. By1 or Bz1) and the fourth (e.g. By2 or Bz2) magnetic field component, and optionally outputting or transmitting the first sum (e.g. ΣBx) and the second sum (e.g. ΣBy or ΣBz);

e) determining 605 a second angle (θ2) based on a ratio of the first sum (e.g. ΣBx) and the second sum (e.g. ΣBy or ΣBz), and optionally outputting or transmitting the second angle (θ2);

f) comparing 606 the first angle (θ1) and the second angle (θ2), and detecting an error based on a result of the comparison, and optionally outputting or transmitting a corresponding diagnostic signal.

The method may comprise a further step, such as providing an acoustic signal (e.g. an audible sound) or a visible signal (e.g. a light signal) in case an error is detected. If the sensor device is connected to an ECU, the ECU may take appropriate action, in manners known per se in the art.

Figure 7:
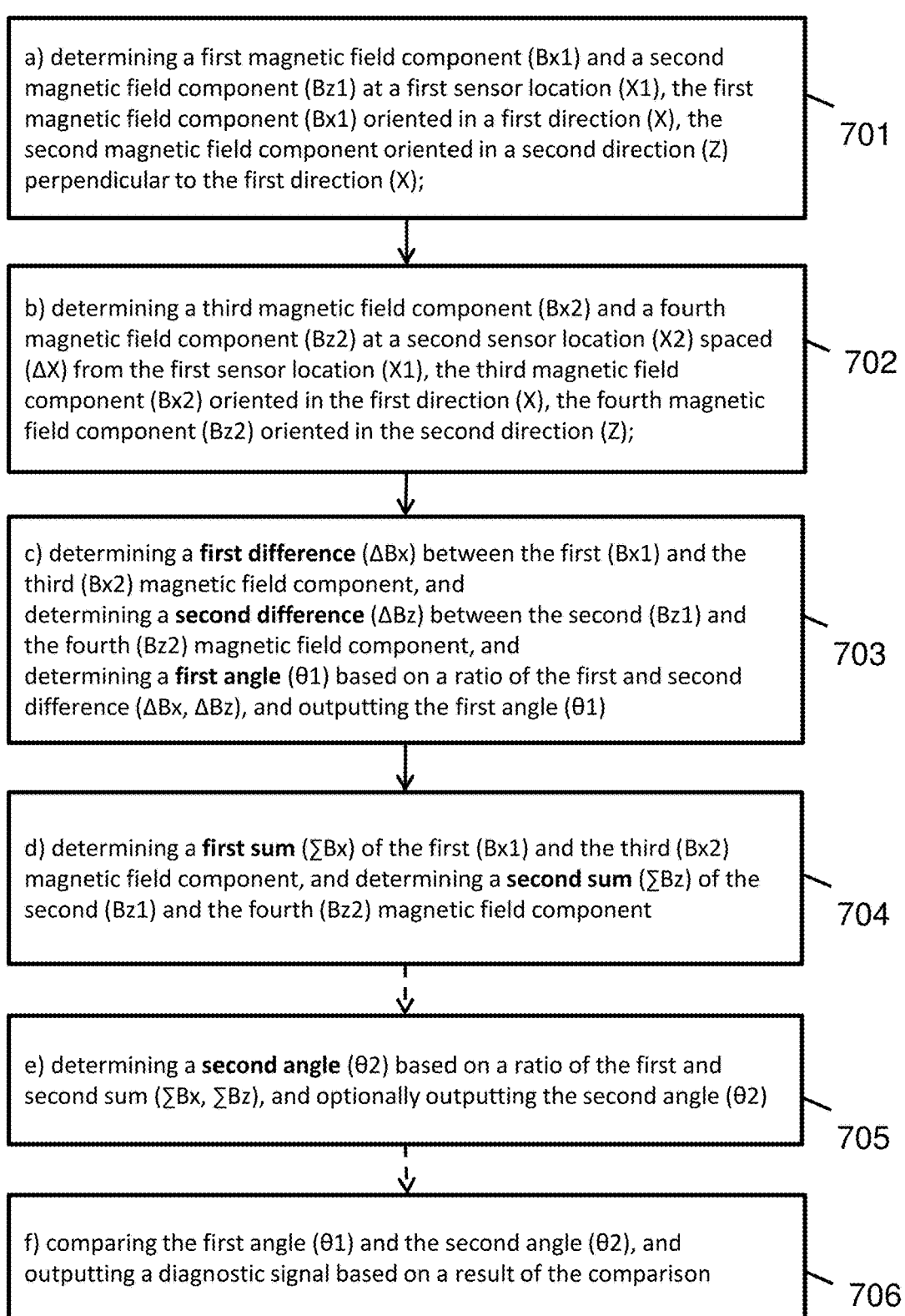
FIG. 7 to FIG. 9 show specific examples of the method of FIG. 6, illustrating steps which may be performed by a position sensor device of a position sensor system according to the present invention.

The method steps 601 to 606 may be performed solely by the position sensor device, or partly by the position sensor device and partly by a second processor, e.g. an electronic control unit (ECU) communicatively connected to the position sensor device. Three examples are described:

In an embodiment, all of the steps a) to f) are performed by the position sensor device itself. In this case, the first and second sum do not need to be output in step d), the second angle does not have to be output in step e), but a diagnostic signal has to be output in step f). In this embodiment, no steps need to be performed outside of the position sensor device, in order to detect if an error has occurred. Such a method 700 is illustrated in FIG. 7, which is a subset of FIG. 6.

Figure 8:
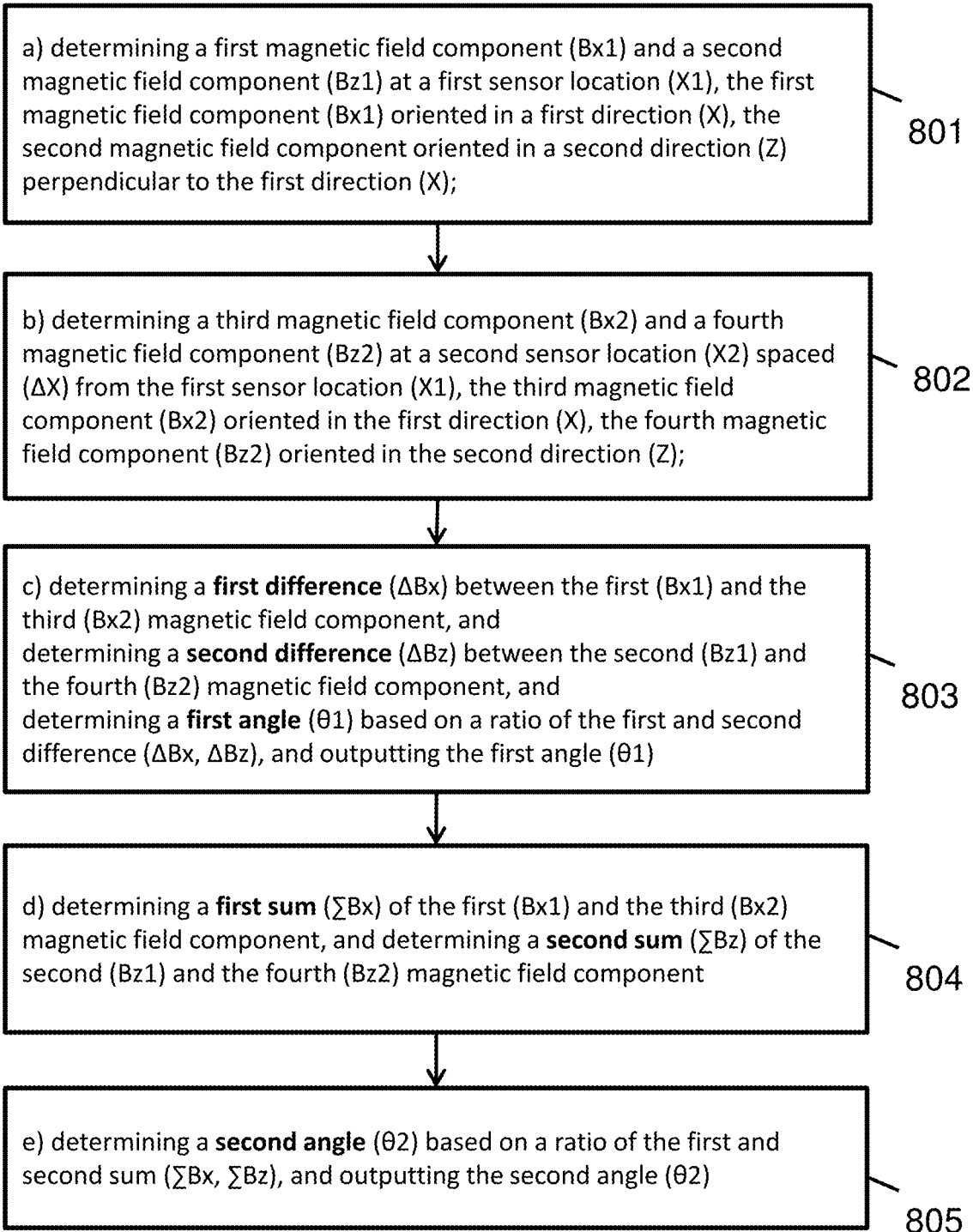

In an embodiment, the position sensor system comprises said second processor (e.g. an ECU), and this second controller is configured for receiving the first and the second angle, and for comparing them in step f). In this embodiment, the position sensor device does not have to perform step f) and does not have to output the first and second sum in step d), but has to output the second angle in step e) for allowing the second processor to perform the comparison. Such a method 800 is illustrated in FIG. 8, which is another subset of FIG. 6.

Figure 9:
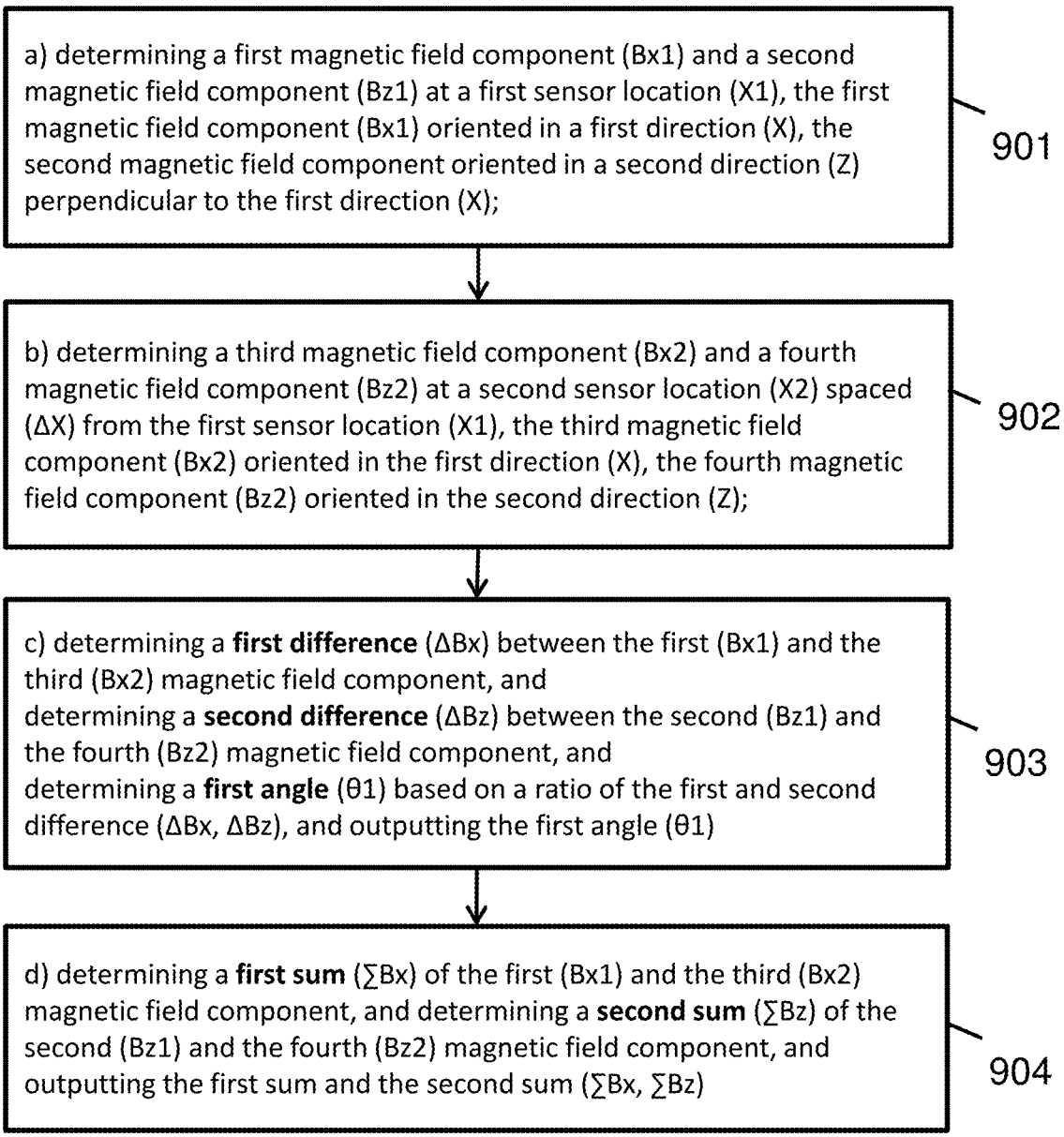

In an embodiment, the position sensor system comprises said second processor (e.g. an ECU), and this second controller is configured for receiving the first sum and the second sum in step d), and for calculating the second angle in step e), and for comparing the first and second angle in step f) in order to detect whether an error has occurred. In this embodiment, the position sensor device does not have to perform steps e) and f), but has to output the first and second sum in step d) for allowing the second processor to compute the second angle. Such a method 900 is illustrated in FIG. 9, which is another subset of FIG. 6.

Figure 10:
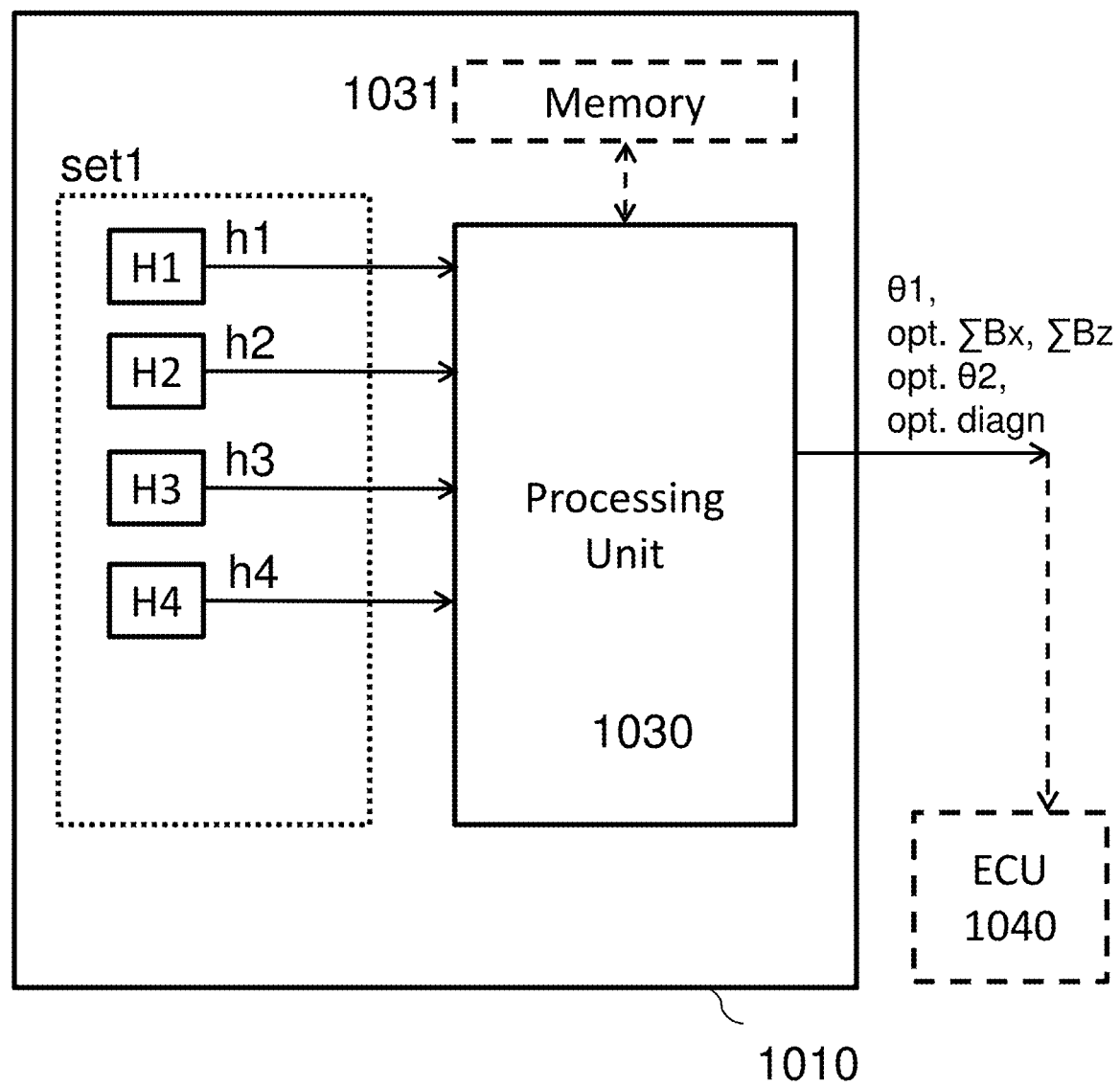
FIG. 10 to FIG. 12 show electrical block-diagrams of circuits that may be used in position sensor devices described above.
Figure 11:
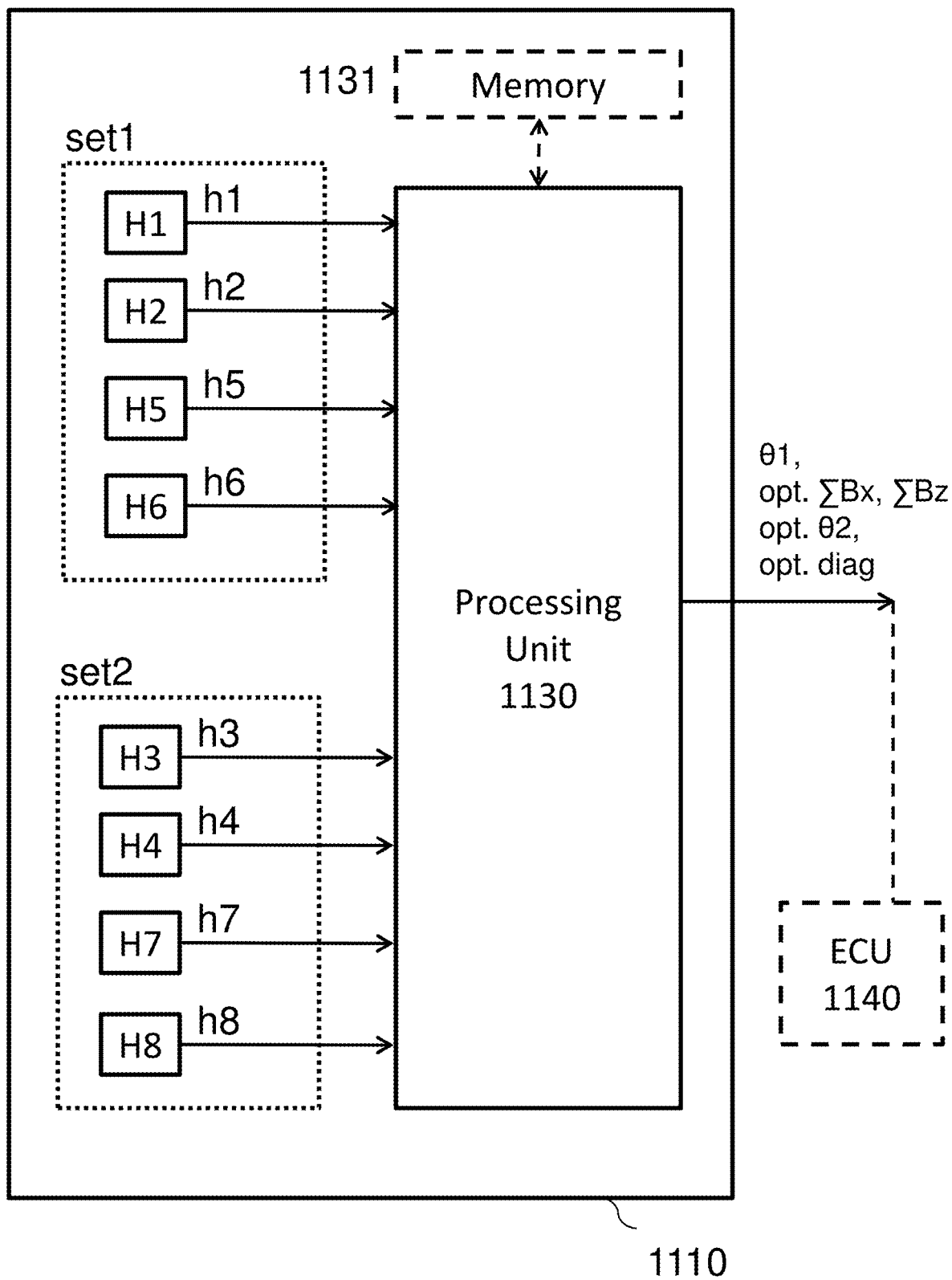
Figure 12:
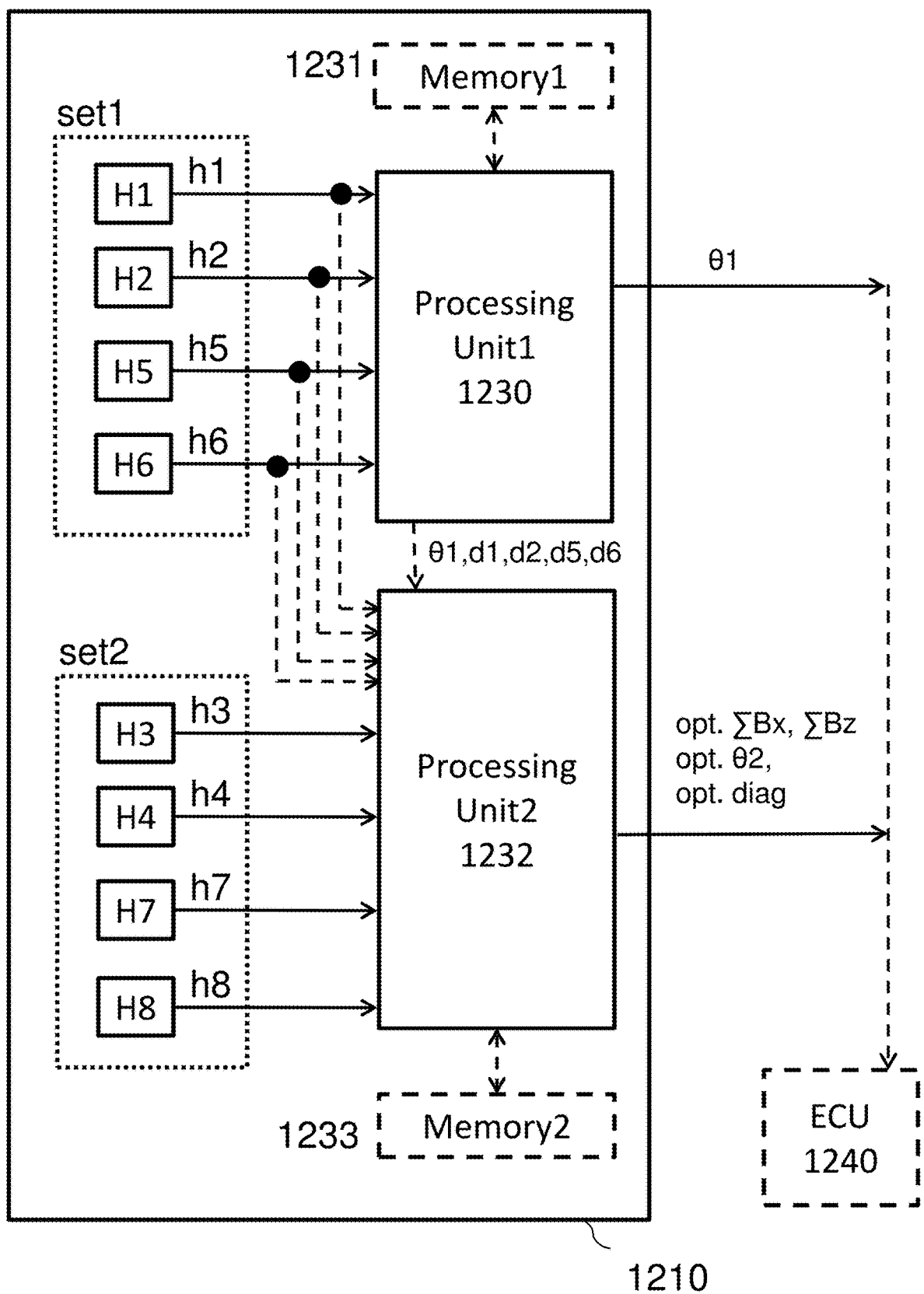

FIG. 10 to FIG. 12 show electrical block-diagrams of circuits that may be used in position sensor devices described above.

FIG. 10 shows an electrical block-diagram of a circuit 1010 that may be used in position sensor devices described above. The circuit 1010 comprises a plurality of magnetic sensors elements H1 to H4, and a processing unit 1030, and a non-volatile memory 1031. This block-diagram may be used for example in sensor devices having a sensor structure capable of determining a magnetic field gradient dBx/dx and a magnetic field gradient dBz/dx, for example as illustrated in FIG. 1 or FIG. 3(c) or FIG. 3(e) or FIG. 4(d) or FIG. 5(d) or FIG. 5(f). The sensor elements may be Hall elements, e.g. vertical Hall elements and/or horizontal Hall elements, MR elements, etc.

The processing unit 1030 may be configured for performing any of the methods shown in FIG. 6 to FIG. 9. The sensor device 1010 may be connected to a second processor 1040, for example to an electronic control unit 1040 (ECU), by means of one or more wires, or wireless (e.g. via a radio frequency link RF, or an infra-red link IR). Depending on which method is implemented, the sensor device 1010 may output one or more of the following values: a first angle θ1, a second angle θ2, a first sum ΣBx, a second sum ΣBy or ΣBz, and a diagnostic signal "diag"; and the second processor 1040, if present, may be configured for receiving one or more of these values, and may be configured for calculating the second angle θ2 and/or for comparing the two angles, as described above.

The first angle θ1 may be determined in manners described above, for example by using some of the mathematical formulas [1] to [17b] described above, or using a look-up table, optionally with interpolation. As explained above, the first angle θ1 is based on a ratio of difference signals. The subtraction may be performed in the analog domain before or after amplification, or in the digital domain.

The processing unit 1030 may comprise a digital processor, which may optionally comprise or be connected to a non-volatile memory 1031. This memory may be configured for storing one or more constants, for example one or more of the predefined threshold values ε, τ, L, M. The digital processor 1030 may for example be an 8-bit processor, or a 16-bit processor.

While not explicitly shown, the circuit 1010 may further comprise one or more components or sub-circuits selected from the group consisting of: a biasing source (e.g. a current source, a voltage source), an amplifier, a differential amplifier, an analog-to-digital convertor (ADC), etc. The ADC may have a resolution of at least 8 bits, or at least 10 bits, or at least 12 bits, or at least 14 bits, or at least 16 bits.

FIG. 11 shows an electrical block-diagram of a circuit 1110 that may be used in position sensor devices described above. The circuit 1110 can be considered a variant of the circuit of FIG. 10, and most of what has been described above is also applicable here, mutatis mutandis.

The main difference between the sensor device of FIG. 10 and the sensor device of FIG. 11 is that the circuit 1110 comprises eight magnetic sensor elements H1 to H8 instead of only four, and that other formulas or look-up table(s) may be used to compute the first and second angle. This block-diagram may be used for example in sensor devices having a sensor structure as illustrated in FIG. 2 or FIG. 3(d) or FIG. 4(c) or FIG. 5(e).

FIG. 12 shows a variant of the electrical block-diagram of FIG. 11, having a first processing unit 1230 and a second processing unit 1232, and having eight sensor elements H1 to H8.

The first processing unit may be configured for determining a first angle θ1 in the same manner as the circuit of FIG. 10, for example using the formulas [1] to [6] and [10] to [13], e.g. in accordance with the formulas of "Example1" in FIG. 3(f).

The second processing unit 1232 may be configured for determining the second angle θ2 using the formulas illustrated as "Example2" in FIG. 3(f), or using the formulas illustrated as "Example1" of FIG. 4(e). In case the comparison of the two angles is performed inside the device 1210, the first processing unit 1230 may be furthermore configured for providing the first angle value θ1 to the second processing unit 1232 for allowing the comparison.

The first processing unit 1230 receives signals h1, h2, h5, h6 from a first subset of the eight sensor elements where they are digitized. The second processing unit 1232 receives signals originating from all the sensor elements H1 to H8. The second subset of signals h3, h4, h7, h8 are received from the sensor elements H3, H4, H7, H8, but in order to detect whether an error has occurred, the second processing unit 1232 also needs the first subset of signals. These may be received directly from the sensor elements, or indirectly via the first processing unit 1230, e.g. after digitization into values d1, d2, d5, d6.

Figure 13A:
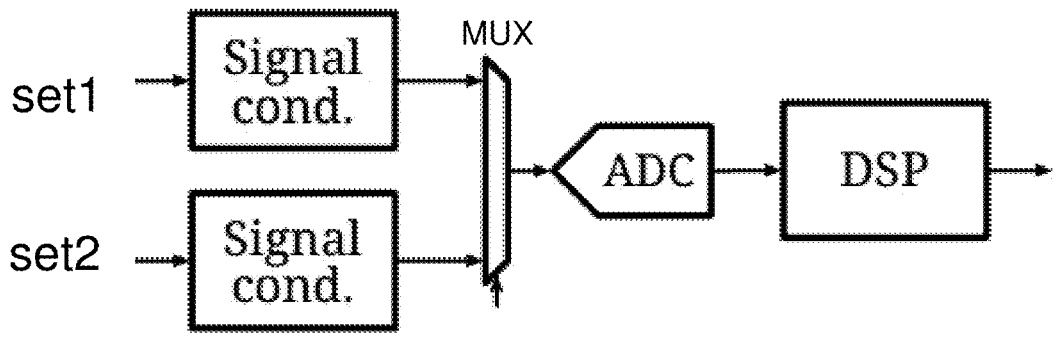
FIG. 13(a) to FIG. 13(c) shows several circuit topologies which may be used to readout and optionally process the signals provided by two sets of magnetic sensor elements, as may be used in embodiments of the present invention.
Figure 13B:
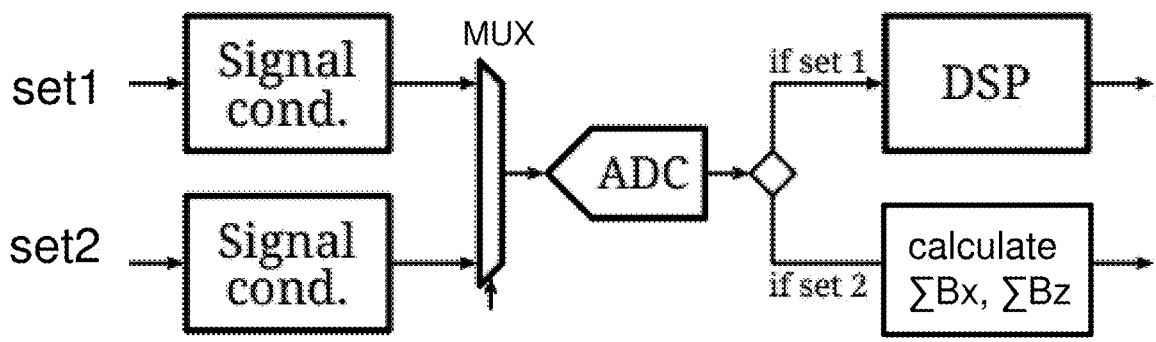
Figure 13C:
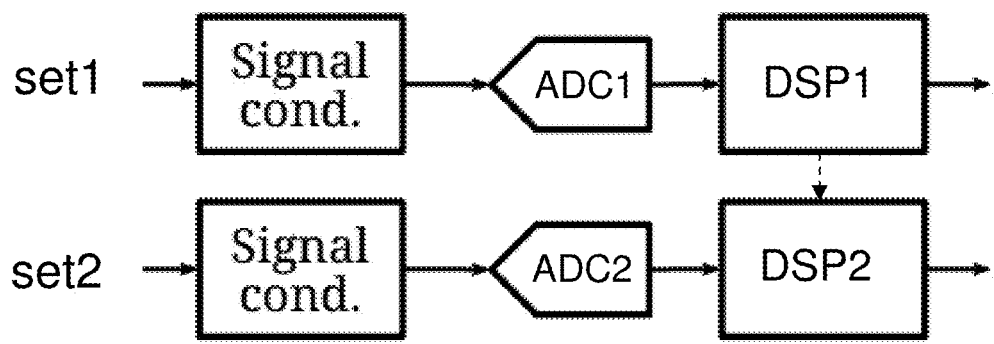

FIG. 13(a) to FIG. 13(c) show several circuit topologies which may be used to readout and optionally process the signals provided by the sensor devices described above.

FIG. 13(a) shows a block-diagram of a readout-circuit, comprising a multiplexer MUX, a single analog-to-digital convertor ADC, and a single digital processor DSP. This block-diagram may be used in the circuit of FIG. 10 and is primarily aimed at detecting errors related to the Hall elements (transducers) and their biasing and readout circuitry. The main purpose of this block-diagram is to illustrate that the signals from all the sensor elements are processed by a single ADC and a single signal processor, e.g. as also illustrated in FIG. 10 and FIG. 11.

FIG. 13(c) shows a block-diagram of two mainly separate readout-circuits, each comprising an analog-to-digital convertor ADC, and a dedicated digital processor DSP. The upper sub-circuit is configured for digitizing and processing the first set of sensor signals. The lower sub-circuit is configured for digitizing and processing the second set of sensor signals, but the first processor may provide data to the second processor. This block-diagram may be used in the circuit of FIG. 12, where for example the first processor DSP1 may provide the first angle θ1, and a digital representation of the hall signals h1, h2, h5, h6 in the form of digital values d1, d2, d5, d6 to the second processor DSP1. The main purpose of this block-diagram is to illustrate that each of the sensor signals is processed by a single ADC.

FIG. 13(b) shows a block-diagram of another solution, which can be considered as "intermediate solution", having a multiplexer and a single ADC and a single digital processor DSP, and a circuit which sends the digitized values originating from the first set of Hall elements into the DSP for further processing, but which sends the digitized values originating from the second set of Hall elements not into the DSP, but to a digital circuit and/or an arithmetic unit capable of calculating the above described first sum ΣBx, a second sum ΣBy or ΣBz, and to output this data to an external processor, e.g. to an ECU. The main purpose of FIG. 13(b) is to show that it is possible to digitize some of the sensor values in the ADC, without processing them inside the DSP.

From the examples shown in FIG. 10 to FIG. 13(c), it shall be clear to the skilled reader that many hardware implementations are possible.

The systems and methods and devices described herein may be very well suited for industrial, robotic or automotive applications, where "functional safety" is important.

The formulas [10], [13], [14], [17], and [10b], [13b], [14b], [17b] described above are applicable for a two-pole magnet, but the present invention is not limited thereto, and also works for a magnet having at least four poles or at least six poles, or at least eight poles, etc. in which case the arctangent function provides θ/2 or θ/3 or θ/4, etc., where θ represents the mechanical rotation angle.

In a variant of FIG. 3(a), not shown, the sensor device is rotated by 90° over the X-axis, such that its semiconductor substrate is parallel to the rotation axis A. In this case the formulas of FIG. 4(e) may be used, based on the ΔBx, ΔBy, ΣBx, ΣBy rather than ΔBx, ΔBz, ΣBx, ΣBz.

Above, a mechanism is described for detecting an error based on the outcome of a comparison of a first angle calculated as a first function of a ratio of two differences, and a second angle calculated as a second function of a ratio of two sums. Optionally additional tests may be performed for detecting whether an error has occurred. For example, in an embodiment, the processing unit is further configured for determining a third sum (Sum3) as the sum of the square of the first difference (ΔBx) and the square of the second difference (ΔBy; ΔBz), e.g. in accordance with the following formula:

$$\text{Sum3} = \text{sqr}(\Delta Bx) + \text{sqr}(\Delta Bz) \quad [18]$$

and for optionally outputting this third sum; and is further configured for determining a fourth sum (Sum4) calculated as the sum of the square of the first sum (ΣBx) and the square of the second sum (ΣBy; ΣBz), e.g. in accordance with the following formula:

$$\text{Sum4} = \text{sqr}(\Sigma Bx) + \text{sqr}(\Sigma Bz) \quad [19]$$

and for optionally outputting this fourth sum; and is further configured for scaling the fourth sum with a predefined constant K4, which may be determined during design, or may be determined during calibration and stored in a non-volatile memory of the sensor device; and is further configured for determining if the third sum (Sum3) and the scaled fourth sum (Sum4) are substantially the same within a predefined tolerance margin of at most ±10%, or at most ±5%, for example by calculating a ratio R as (Sum3)/(K4*Sum4), and by testing if this is a value in the range from 90% to 100%, or in the range from 95% to 105%. If the ratio falls within the range, this means that no additional error is detected. If the ratio falls outside the range, it means that an additional error is detected. Similar as above, the calculations of formula [18] and [19] may be calculated completely inside the sensor device itself, or partially inside the sensor device itself, and partially by a second processor (e.g. an ECU) connected to the sensor device, but external to the sensor device. Of course, in this case, one or more intermediate values need to be output by the sensor device for allowing the calculation and/or comparison to be performed outside the sensor device. For example, the third sum Sum3 and the fourth sum Sum4 may be output by the sensor device, and the scaling with the factor K4 and the comparison of Sum3 and (K4*Sum4) may be performed by an ECU.

The invention claimed is:

1. A position sensor device comprising:
   a first sensor configured for determining a first magnetic field component and a second magnetic field component at a first sensor location, the first magnetic field component oriented in a first direction, the second magnetic field component oriented in a second direction perpendicular to the first direction; and
   a second sensor configured for determining a third magnetic field component and a fourth magnetic field component at a second sensor location spaced from the first sensor location, the third magnetic field component oriented in the first direction, the fourth magnetic field component oriented in the second direction;
   a processing unit connected to the first sensor and to the second sensor, and
   configured for determining a first difference between the first and the third magnetic field component, and for determining a second difference between the second and the fourth magnetic field component, and for determining a first angle based on a ratio of the first and second difference, and for outputting the first angle;
   wherein the processing unit is further configured for performing one of the following:
   i) determining a first sum of the first and the third magnetic field component, and determining a second sum of the second and the fourth magnetic field component, and outputting the first sum and the second sum for allowing an external processor to determine a second angle and to compare the first and second angle in order to detect an error;
   ii) determining a first sum of the first and the third magnetic field component, and determining a second sum of the second and the fourth magnetic field component, and determining a second angle based on a ratio of the first sum and the second sum, and outputting the second angle for allowing an external processor to compare the first and second angle in order to detect an error;
   iii) determining a first sum of the first and the third magnetic field component and determining a second sum of the second and the fourth magnetic field component and determining a second angle based on a ratio of the first sum and the second sum, and comparing the first angle and the second angle, and outputting a diagnostic signal based on a result of the comparison.

2. The position sensor device according to claim 1,
wherein the first sensor comprises a first integrated magnetic concentrator and a first and a second horizontal Hall element arranged on opposite sides of the first IMC; and
wherein the second sensor comprises a second integrated magnetic concentrator and a third and a fourth horizontal Hall element arranged on opposite sides of the second IMC.

3. The position sensor device according to claim 2,
wherein the first sensor further comprises a fifth and a sixth horizontal Hall element which are 90° spaced from the first and second horizontal Hall element; and
wherein the second sensor further comprises a seventh and an eighth horizontal Hall element which are 90° spaced from the third and fourth horizontal Hall element.

4. The position sensor device according to claim 1,
wherein the first sensor comprises a first horizontal Hall element, and a first vertical Hall element; and
wherein the second sensor comprises a second horizontal Hall element, and a second vertical Hall element.

5. The position sensor device according to claim 1,
wherein the first sensor comprises a first and a second vertical Hall element; and
wherein the second sensor comprises a third and a fourth vertical Hall element.

6. A magnetic position sensor system comprising:
a magnetic source for generating a magnetic field having at least two poles;
a position sensor device according to claim 1, movable relative to said magnetic source, or vice versa.

7. The magnetic position sensor system according to claim 6,
wherein the magnetic source is a permanent magnet, rotatable about a rotation axis; and
wherein the position sensor device is mounted at a non-zero radial distance and is oriented such that the first direction is tangential to an imaginary circle having a centre on the rotation axis.

8. The magnetic position sensor system according to claim 6,
wherein the magnetic source is an elongated structure comprising a plurality of alternating magnetic poles extending in a longitudinal direction; and
wherein the position sensor device is movable in the longitudinal direction, at a nonzero distance from the magnetic source.

9. The magnetic position sensor system according to claim 6,
further comprising a second processor communicatively connected to the position sensor device, and configured for performing one of the following:
i) receiving the first angle and receiving the first sum and the second sum, and determining the second angle based on a ratio of the first sum and the second sum, and comparing the first and second angle to detect an error;
ii) receiving the first angle, and receiving the second angle, and comparing the first and second angle to detect an error;
iii) receiving the first angle and receiving a diagnostic signal indicative of an error.

10. A method of determining a position of a position sensor device relative to a magnetic source, comprising the steps of:
a) determining a first magnetic field component and a second magnetic field component at a first sensor location, the first magnetic field component being oriented in a first direction, the second magnetic field component being oriented in a second direction perpendicular to the first direction;
b) determining a third magnetic field component and a fourth magnetic field component at a second sensor location spaced from the first sensor location, the third magnetic field component oriented in the first direction, the fourth magnetic field component oriented in the second direction;
c) determining a first difference between the first and the third magnetic field component, and determining a second difference between the second and the fourth magnetic field component, and determining a first angle based on a ratio of the first and second difference, and outputting the first angle;
d) determining a first sum of the first and the third magnetic field component, and determining a second sum of the second and the fourth magnetic field component;
e) determining a second angle based on a ratio of the first sum and the second sum;
f) comparing the first angle and the second angle.

11. The method according to claim 10,
wherein the system further comprises a second processor connected to the position sensor device, and
wherein the method further comprising the steps of:
receiving by the second processor the first angle;
and one of the following steps:
i) receiving the first angle and receiving the first sum and the second sum, and determining the second angle based on a ratio of the first sum and the second sum, and comparing the first and second angle to detect an error;
ii) receiving the first angle, and receiving the second angle, and comparing the first and second angle to detect an error;
iii) receiving the first angle and receiving a diagnostic signal indicative of an error.

12. The method according to claim 10,
wherein the step of comparing the first and second angle comprises:
testing if the difference between the first and second angle is a value in a predefined range.

13. The method according to claim 10,
wherein the step d) further comprises outputting or transmitting the first sum and the second sum to a second processor.

14. The method according to claim 10,
wherein the step e) further comprises outputting or transmitting the second angle.

15. The method according to claim 10,
wherein the step f) further comprises outputting a diagnostic signal based on a result of the comparison.

* * * * *